May 19, 1959     T. WALKER     2,886,873
HOOK FASTENINGS FOR THE WAIST-BANDS OF TROUSERS
Filed June 18, 1956
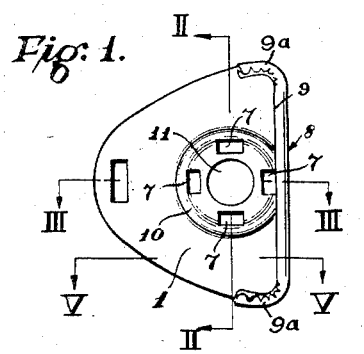
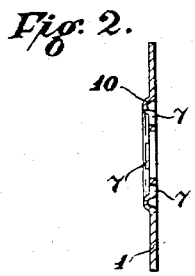
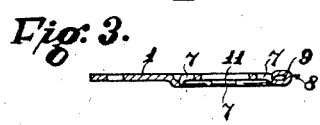
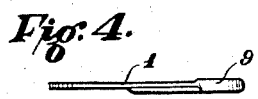
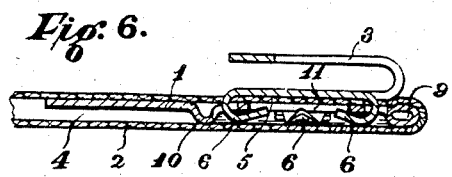
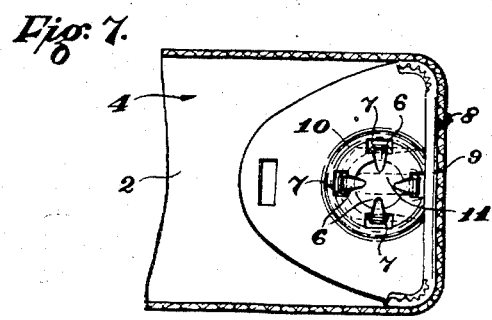
INVENTOR
T. Walker
BY
Richards & Geier
ATTORNEYS

United States Patent Office 2,886,873
Patented May 19, 1959

1

2,886,873

HOOK FASTENINGS FOR THE WAIST-BANDS OF TROUSERS

Thomas Walker, Birmingham, England, assignor to Thomas Walker Limited, Birmingham, England, a British company Application June 18, 1956, Serial No. 591,958

Claims priority, application Great Britain October 18, 1955

2 Claims. (Cl. 24—227)

This invention relates to hook fastenings for the waist-bands of trousers, wherein a hook element, adapted to be releasably engaged with a co-operating part on the trousers, is secured to the waist-band by a separate back-plate fitting into a pocket or the like in the waist-band, the hook being secured to the back-plate, for example by prongs on the hook passed through the material of one side of the waist-band and bent or clenched over on to the back-plate. Hitherto, the separate back-plate has been relatively small, being, for example, of a ring-like form of substantially the same size as the base of the hook portion, and it is found, in use, that the back-plate has a tendency to tear or to pull away from the material of the waist-band. It is the object of the present invention to provide the hook with a separate back-plate of an improved and novel form which will avoid the above disadvantage and which will, at the same time, prevent the waist-band from being damaged by the pull on the hook.

According to the invention, a back-plate for securing a separate hook member to a trouser waist-band is formed with a ribbed, rolled-over or beaded outer edge. The back-plate may be of a substantially triangular form with a straight rolled-over or beaded edge and with aperture to receive prongs on the hook, the back-plate being arranged, in use, so that the straight edge lies up against the closed end of a pocket in the waist-band and thus takes the strain off the material of the waist-band at the points where the prongs pass through the same.

Also, according to the invention, a trouser waist-band is provided with a hook secured by a separate back-plate located within a pocket in the waist-band and formed with a ribbed, rolled-over or beaded edge engaging, or capable of engaging, a closed end of the pocket.

Figure 1 of the accompanying drawings is a view of the outer face of a back-plate constructed in accordance with this invention, and intended for securing a separate hook part to a trouser waist-band.

Figure 2 represents a section on the line II—II, Figure 1.

Figure 3 is a section on the line III—III, Figure 1.

Figure 4 represents an edge view of the back-plate.

Figure 5 shows a cross-section on the line V—V, Figure 1, upon a larger scale.

Figure 6 is a sectional view upon a larger scale showing the back-plate housed within a trouser waist-band and attached to the separate hook part.

Figure 7 is a view of the outer face of the back-plate, with the latter housed within the waist-band (shown in section) and attached to the separate hook part, showing the prongs of the latter bent down on to the back-plate.

Figure 8 represents a perspective view of a modified form of back-plate.

Referring to Figures 1 to 7 of the drawings, the improved back-plate 1 is intended to form a part of a hook attachment for a trouser waist-band 2, with a hook element 3 which is formed separately from the back-plate, the latter being intended to be inserted within a pocket 4

2 in the waist-band, as shown in Figures 6 and 7. The hook 3 has a base part 5 (Figure 6) provided with integral prongs 6, which, after being inserted through the material of the waist-band 2, are passed through apertures 7 in the back-plate 1 and are bent or clenched over on to the latter. The back-plate 1, which is considerably larger than the base 5 of the hook, is made of sheet-metal and is of a substantially triangular shape, as shown, with one edge 8 straight and the other edges, if desired, slightly outwardly curved. This straight edge 8, which lies adjacent, and alongside, the closed end of the hook 3, when the latter is attached to the plate, is formed, by folding or rolling over the metal of the plate, with a narrow beading or rib 9 of the cross-section shown in Figure 5 giving to the said straight edge of the plate a smooth, rounded tubular form. The beading or rib 9, thus formed and consisting of a double thickness of metal, extends along the full length of the said straight edge 8 of the plate, and is continued around the adjacent corners 9a of the latter, the corners being rounded, and the beading following the rounded shape of the corners as shown in the drawings. In addition, the back-plate 1 is formed with a pressed-up circular rib 10 upon its outer face, this rib encircling, as shown in Figures 1 and 7, the prong-receiving apertures 7 in the back-plate. The latter is also formed with a circular opening 11.

To attach the hook 3 to the trouser waist-band 2, the triangular back-plate 1 is inserted into the pocket 4 in the waist-band so that the straight beaded edge 8 of the plate lies close up against a closed end of the said pocket, as shown in Figures 6 and 7. The prongs 6 of the hook are then passed through the material of the one side of the pocket 4 and are engaged through the apertures 6 in the back-plate, being then clenched or swedged down on to the latter. The extremities of the prongs may then enter the opening 11. In use, instead of the pull on the cloth being concentrated at the points where the prongs 6 pass through the material all strain is removed from these points and the pull is taken entirely by the beading 9 along the straight edge 8 of the back-plate engaging the closed end of the pocket 4. The material of the waist-band is consequently prevented from being distorted and remains flat, whilst the danger of the material of the waist-band tearing away adjacent the prongs 6 is obviated. The hook 3 may engage a co-operating fastening part of any suitable form, such as a staple, or beneath the bent-over ends of a metal plate.

When the prongs 6 of the hook have been clenched down on to the back-plate 1, the top of the circular rib 10 on the latter will be substantially level with the tops of the bent-down prongs as will be clear from Figure 6 of the drawings and the rib 10 will thus form a guard and prevent the prongs from damaging the material of the waist-band.

The back-plate 1 may, if desired, be curved transversely to the length of the waist-band, to follow more or less the curvature of the body of the user. This prevents, or minimises, any tendency for the straight edge of the back-plate to tilt outwards when a pull is exerted on the hook.

The beaded or folded-over part 9 may, if desired, extend only along the straight edge 8 of the back-plate, without being continued around the corners.

The back-plate may be of any other suitable shape, and it may be flat or curved, provided it has a ribbed, folded-over or beaded edge.

In the modified embodiment of the invention shown in Figure 8 of the drawings, a sheet metal back-plate 12 having a folded-over or beaded straight edge 13 is formed with struck-up prongs 14 for engaging apertures in a base part of a hook member, instead of being formed with

I claim:

1. A sheet-metal back-plate for attaching a separate hook member to the outside of a trousers' waistband material which is formed as a pocket, said back-plate having means for securing said hook member and said plate being non-circular in shape, comprising a straight edge portion having corners at each end of said straight edge portion contiguous therewith, and beading means along said straight edge portion and extending around said corners, said beading means being at least twice the thickness of the main part of the back-plate and providing a smooth pressure surface adapted to engage the material at the closed end of the waistband pocket, whereby the strain on the material during use is lessened and the shape of the waistband is maintained.

2. A sheet-metal back-plate for attaching a separate pronged hook member to the outside of a trousers' waistband material which is formed as a pocket, said back-plate being non-circular in shape and having apertures for receiving the prongs of said hook member so as to secure the latter, and comprising a raised circular rib around said apertures, a straight edge portion having corners at each end of said straight edge portion contiguous therewith, and beading means along said straight edge portion and extending around said corners, said beading means having a thickness substantially equal to the height of the raised rib and at least twice the thickness of the material forming the main part of the back-plate, providing a smooth pressure surface adapted to engage the material at the closed end of the waistband pocket, whereby the strain on the material during use is lessened and the shape of the waistband is maintained.

References Cited in the file of this patent

UNITED STATES PATENTS

| | | |
|---|---|---|
| 300,451 | Downham | June 17, 1884 |
| 573,470 | Kerngood | Dec. 22, 1896 |
| 703,526 | Brewington | July 1, 1902 |
| 996,181 | Whiting | June 27, 1911 |
| 1,229,562 | Willetts | June 12, 1917 |
| 2,703,915 | Markin | Mar. 15, 1955 |
| 2,731,690 | Steinmetz | Jan. 24, 1956 |